United States Patent
Obuchi et al.

(10) Patent No.: US 10,421,557 B2
(45) Date of Patent: Sep. 24, 2019

(54) ELECTRIC CONDUCTION STRUCTURE FOR JET ENGINE

(71) Applicant: IHI Corporation, Koto-ku (JP)

(72) Inventors: Kenro Obuchi, Tokyo (JP); Hiroyuki Yagi, Tokyo (JP); Hiroyuki Furukawa, Tokyo (JP); Hideo Morita, Tokyo (JP); Takaomi Inada, Tokyo (JP)

(73) Assignee: IHI Corporation, Koto-ku (JP)

( * ) Notice: Subject to any disclaimer, the term of this patent is extended or adjusted under 35 U.S.C. 154(b) by 620 days.

(21) Appl. No.: 15/068,703

(22) Filed: Mar. 14, 2016

(65) Prior Publication Data

US 2016/0194091 A1 Jul. 7, 2016

Related U.S. Application Data

(63) Continuation of application No. PCT/JP2014/069337, filed on Jul. 22, 2014.

(30) Foreign Application Priority Data

Sep. 18, 2013 (JP) ................................. 2013-192712

(51) Int. Cl.
*B64D 45/02* (2006.01)
*F01D 9/02* (2006.01)
(Continued)

(52) U.S. Cl.
CPC .............. *B64D 45/02* (2013.01); *F01D 9/02* (2013.01); *F01D 9/041* (2013.01); *F01D 25/005* (2013.01);
(Continued)

(58) Field of Classification Search
None
See application file for complete search history.

(56) References Cited

U.S. PATENT DOCUMENTS

| 3,762,835 A | 10/1973 | Carlson et al. |
| 3,989,984 A | 11/1976 | Amason et al. |

(Continued)

FOREIGN PATENT DOCUMENTS

| CN | 1143945 C | 3/2004 |
| CN | 102200055 A | 9/2011 |

(Continued)

OTHER PUBLICATIONS

International Search Report dated Oct. 28, 2014 in PCT/JP2014/069337, filed Jul. 22, 2014 (with English Translation).

(Continued)

*Primary Examiner* — Igor Kershteyn
*Assistant Examiner* — Juan G Flores
(74) *Attorney, Agent, or Firm* — Oblon, McClelland, Maier & Neustadt, L.L.P.

(57) ABSTRACT

An electric conduction structure for conducting and diverting electric current from a vane main body of an cutlet guide vane into en exterior support structure is comprised of: a sheath of a metal covering a leading edge of the vane main body; and an electrically conductive pad of the metal comprising a contact portion so dimensioned as to have an overlap with an end of the sheath, and a washer portion into which a bolt for being tightened into the support structure is insertable, wherein any joints of a weld, a spot-weld, a solder, a bond by an electrically conductive paste and a crimp establish connection between the end of the sheath and the contact portion.

4 Claims, 6 Drawing Sheets

(51) Int. Cl.
*F02C 7/25* (2006.01)
*F01D 9/04* (2006.01)
*F01D 25/00* (2006.01)

(52) U.S. Cl.
CPC .......... *F02C 7/25* (2013.01); *F05D 2220/323* (2013.01); *F05D 2240/121* (2013.01); *F05D 2300/133* (2013.01); *F05D 2300/171* (2013.01); *F05D 2300/174* (2013.01); *F05D 2300/177* (2013.01); *F05D 2300/43* (2013.01)

(56) References Cited

U.S. PATENT DOCUMENTS

| | | | | |
|---|---|---|---|---|
| 4,944,655 | A * | 7/1990 | Merz | B64C 11/26 416/146 R |
| 5,271,714 | A | 12/1993 | Shepherd et al. | |
| 5,314,309 | A | 5/1994 | Blakeley et al. | |
| 5,863,181 | A * | 1/1999 | Bost | B64C 11/205 416/224 |
| 8,727,721 | B2 * | 5/2014 | Tudor | F01D 5/147 415/209.4 |
| 8,851,855 | B2 * | 10/2014 | James | F01D 5/282 416/224 |
| 9,204,497 | B2 * | 12/2015 | Willmot | F02C 7/12 |
| 2006/0245715 | A1 | 11/2006 | Matsumoto et al. | |
| 2011/0133035 | A1 | 6/2011 | Vauchel et al. | |
| 2012/0003100 | A1 * | 1/2012 | James | F01D 5/282 416/230 |
| 2012/0063050 | A1 | 3/2012 | Langone et al. | |
| 2012/0171025 | A1 | 7/2012 | Tudor et al. | |
| 2012/0171028 | A1 | 7/2012 | Tudor et al. | |
| 2013/0264110 | A1 * | 10/2013 | Willmot | F02C 7/12 174/521 |

FOREIGN PATENT DOCUMENTS

| | | |
|---|---|---|
| EP | 2 366 871 A1 | 9/2011 |
| EP | 2 405 101 A2 | 1/2012 |
| EP | 2 472 060 A1 | 7/2012 |
| FR | 2 914 275 A1 | 10/2008 |
| FR | 2 926 337 A1 | 7/2009 |
| GB | 2 218 473 A | 11/1989 |
| JP | 4-232338 A | 8/1992 |
| JP | 2000-204902 | 7/2000 |
| JP | 2006-307698 | 11/2006 |
| JP | 2011-51517 | 3/2011 |
| JP | 2012-13017 | 1/2012 |
| JP | 2012-140945 | 7/2012 |
| JP | 2012-154320 | 8/2012 |
| JP | 2012-527375 | 11/2012 |
| RU | 2011 107 876 A | 9/2012 |
| WO | WO 2010/135318 A2 | 11/2010 |

OTHER PUBLICATIONS

Written Opinion dated Oct. 28, 2014 in PCT/JP2014/069337, filed Jul. 22, 2014.
Combined Chinese Office Action and Search Report dated Feb. 21, 2017 in Patent Application No. 201480050726.4 (with English translation of Categories of Cited Documents).
Extended European Search Report dated Mar. 23, 2017 in Patent Application No. 14845967.0.
Decision to Grant dated Jun. 8, 2017 in Russian Patent Application No. 2016114271/06 (with English language Translation of Categories of Cited Documents).
Office Action dated Jul. 11, 2017 in Japanese Patent Application No. 2013-192712.
Combined Office Action and Search Report dated Sep. 21, 2016 in Chinese Patent Application No. 201480050726.4 (with English translation of Categories of Cited Documents).

* cited by examiner

ELECTRIC CONDUCTION STRUCTURE FOR JET ENGINE

CROSS-REFERENCE TO RELATED APPLICATIONS

This application is a Continuation Application of PCT International Application No. PCT/JP2014/069337 (filed Jul. 22, 2014), which is in turn based upon and claims the benefit of priority from Japanese Patent Application No. 2013-192712 (filed Sep. 18, 2013), the entire contents of which are incorporated herein by reference.

BACKGROUND

Technical Field

The disclosure relates to an electric conduction structure for safely discharging electric current when an aircraft is struck by lightning, and in particular relates to a structure for conducting the electric current through outlet guide vanes in a turbofan engine with low resistance.

Description of the Related Art

When an aircraft is struck by lightning, its airframe conducts and discharges the electric current through a static discharger or any other means into the atmosphere, thereby removing electric charge from the airframe. If it had a highly resistive portion locally, the electric current through the airframe would bypass this portion and then generate a spark there. This spark could cause damage to certain portions in the airframe or ignite some inflammable materials. Therefore it is necessary to take any measures to sufficiently reduce electric resistance in each and every path through which electric current originated from lightning could flow. A related art is disclosed in International Publication No. WO 2010/135318.

A turbofan engine is a jet engine of a type that has a bypass duct around an engine as a core. Part of energy generated by the engine drives a fan, part of an airflow generated by the fan gushes out rearward directly through the bypass duct, which is used for producing thrust. While outlet guide vanes having a plurality of vanes for rectifying the airflow are provided within the bypass duct, the outlet guide vanes may also function as a support that connects a fan case with the core portion, which encloses the bypass duct.

SUMMARY

In a case where the outlet guide vanes generally connect the fan case with the core portion, the outlet guide vanes are principal paths for electric conduction between the fan case and the core portion. As outlet guide vanes in the prior art were made of any highly conductive material such as aluminum alloys, it had not required particular attention in light of measures against lightning. While use of carbon fiber reinforced plastics (CFRP), which are less conductive than aluminum alloys, has been studied in recent years, its electric resistivity has been believed not to pose a problem because each vane has a sufficient cross-sectional area and therefore has a relatively low resistance and a plurality of such vanes functions as a bundle of conductive paths. Studies by the present inventors, however, have revealed that, when a current passes through the outlet guide vanes of CFRP, the electric resistance between the fan case and the core portion comes up to several ohms. This should be a suspicious value that may give rise to spark generation. Further, an electric current of 100 kA or more could momentarily flow between the fan case and the core portion at a time of lightning strike. In combination with the electric resistance up to several ohms, generated Joule heat could not be disregarded and might rather cause a risk of deteriorating the matrix resin of the CFRP.

According to an aspect, provided is an electric conduction structure for conducting and diverting electric current from a vane main body of an outlet guide vane into an exterior support structure. The electric conduction structure is comprised of: a sheath of a metal covering a leading edge of the vane main body; and an electrically conductive pad of the metal comprising a contact portion so dimensioned as to have an overlap with an end of the sheath, and a washer portion into which a bolt for being tightened into the support structure is insertable, wherein any joints of a weld, a spot-weld, a solder, a bond by an electrically conductive paste and a crimp establish connection between the end of the sheath and the contact portion.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Figure 1:
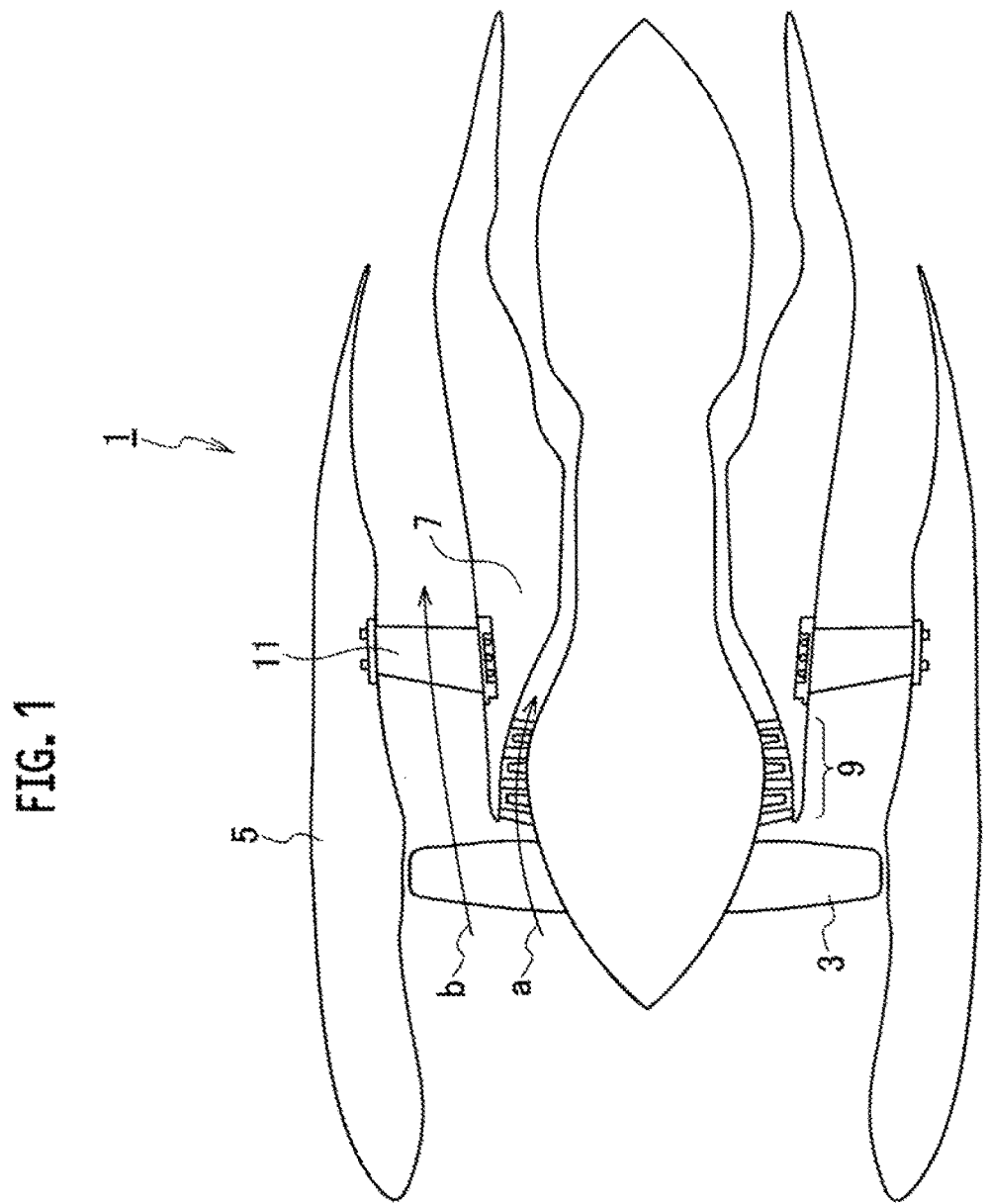
FIG. 1 is a schematic sectional view of a turbofan engine.

Referring to FIG. 1, a turbofan engine 1 is, as an example, comprised of a fan 3 at its center, and an inner wall of a nacelle 5 surrounding its circumference and a core portion 7 define a bypass duct. Part a of an airflow generated by the fan 3 flows into a low-pressure compressor 9 and is used by combustion in the engine but another part b thereof flows into the bypass duct. The part b of the airflow passing through the bypass duct is rectified by outlet guide vanes comprised of a plurality of vanes 11 and then gushes out rearward.

Figure 2:
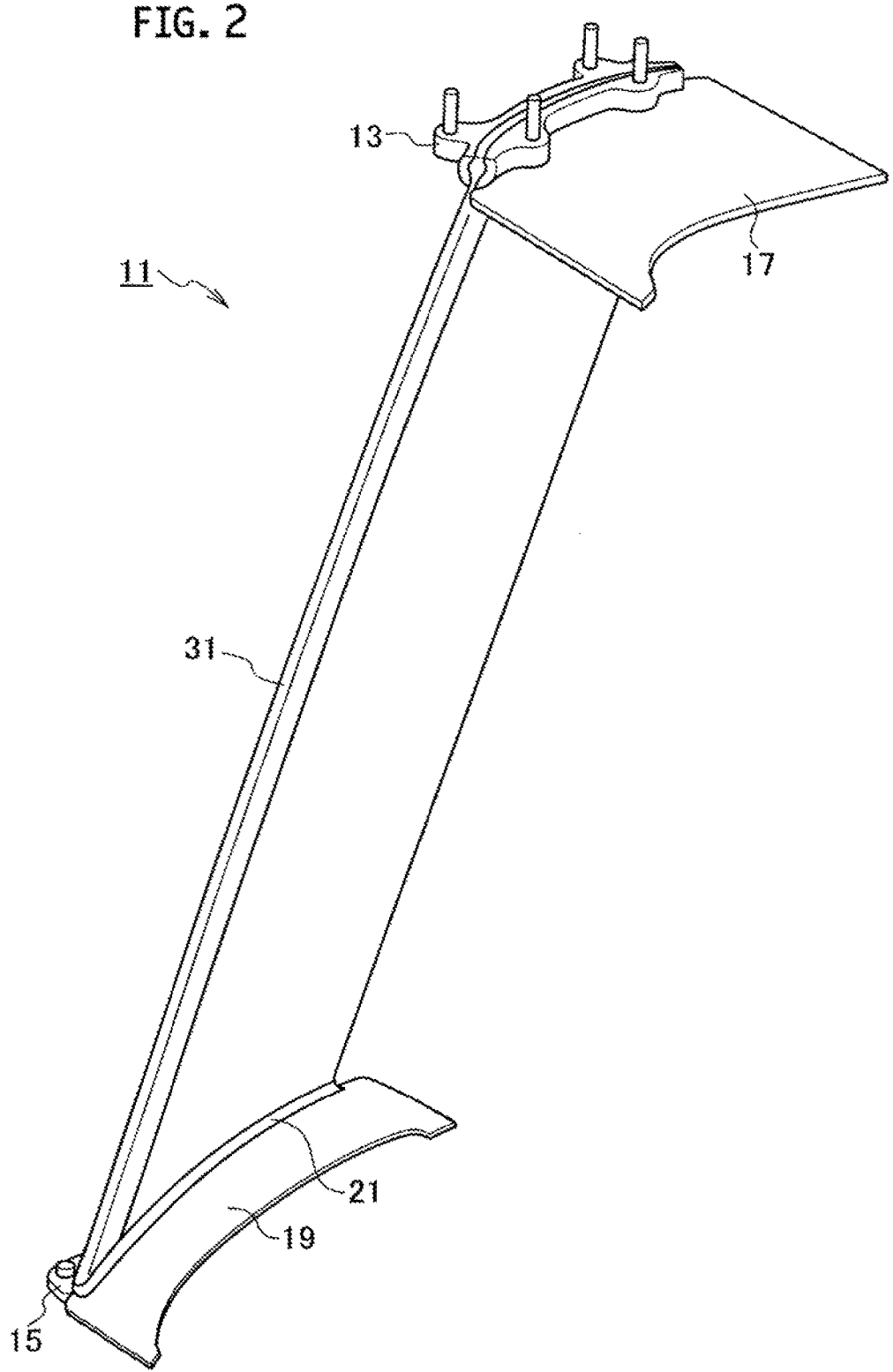
FIG. 2 is a perspective view of an outlet guide vane in accordance with an embodiment.

Referring to FIG. 2, each vane 11 is a plate-like structure having an airfoil shape for airflow rectification and being elongated in the radial direction. A main body of each vane 11 is formed of a carbon fiber reinforced plastic (CFRP) for example. Its outer end is supported by a support structure 13, and its inner end is supported by a similar support structure 15, thereby being fixed to the nacelle 5 and the core portion V.

Adjacent to the support structure 13, having its edge in contact with a face of the vane 11, an outer liner 17 is disposed. Similarly, adjacent to the support structure 15, having its edge in contact with the face of the vane 11, an inner liner 19 is disposed. Further in between the vane 11 and the liners 17,19 interposed are seals 21 for respectively sealing intervening gaps. The liners 17,19 are respectively formed of CFRP but may be of any different material such as an aluminum alloy.

Plural combinations of the vanes 11 and the liners 17,19 are arranged circumferentially to meet side by side, thereby constituting a circular structure. The plurality of outer liners 17 arranged in a cylindrical shape constitutes a part of the inner wall of the nacelle 5, and the plurality of inner liners 19 similarly constitutes a part of the outer wall of the core portion. The outer liners 17 and the inner liners 19 thus define the bypass duct.

Alternatively, in place of the liners, platforms of any aluminum alloy or such are applicable. Generally the platforms get directly in contact with the vanes 11 and these flange portions thereby define the bypass duct.

Figure 3:
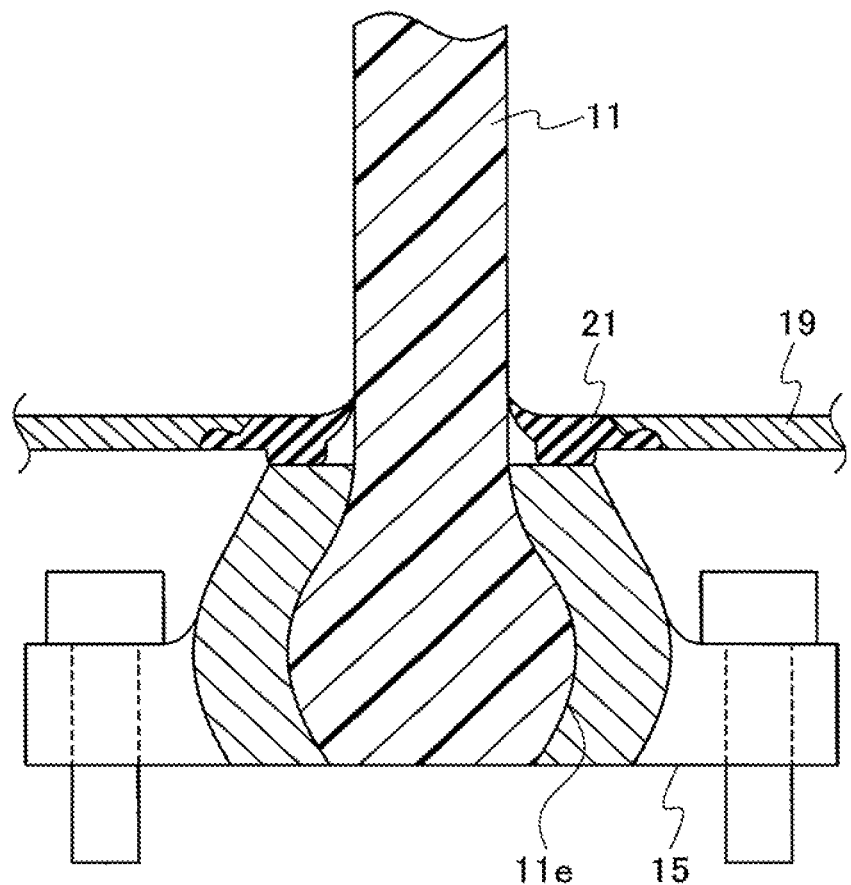
FIG. 3 is a partial sectional view of the outlet guide vane, particularly showing a relation between a vane and a structure supporting the vane.
Figure 4:
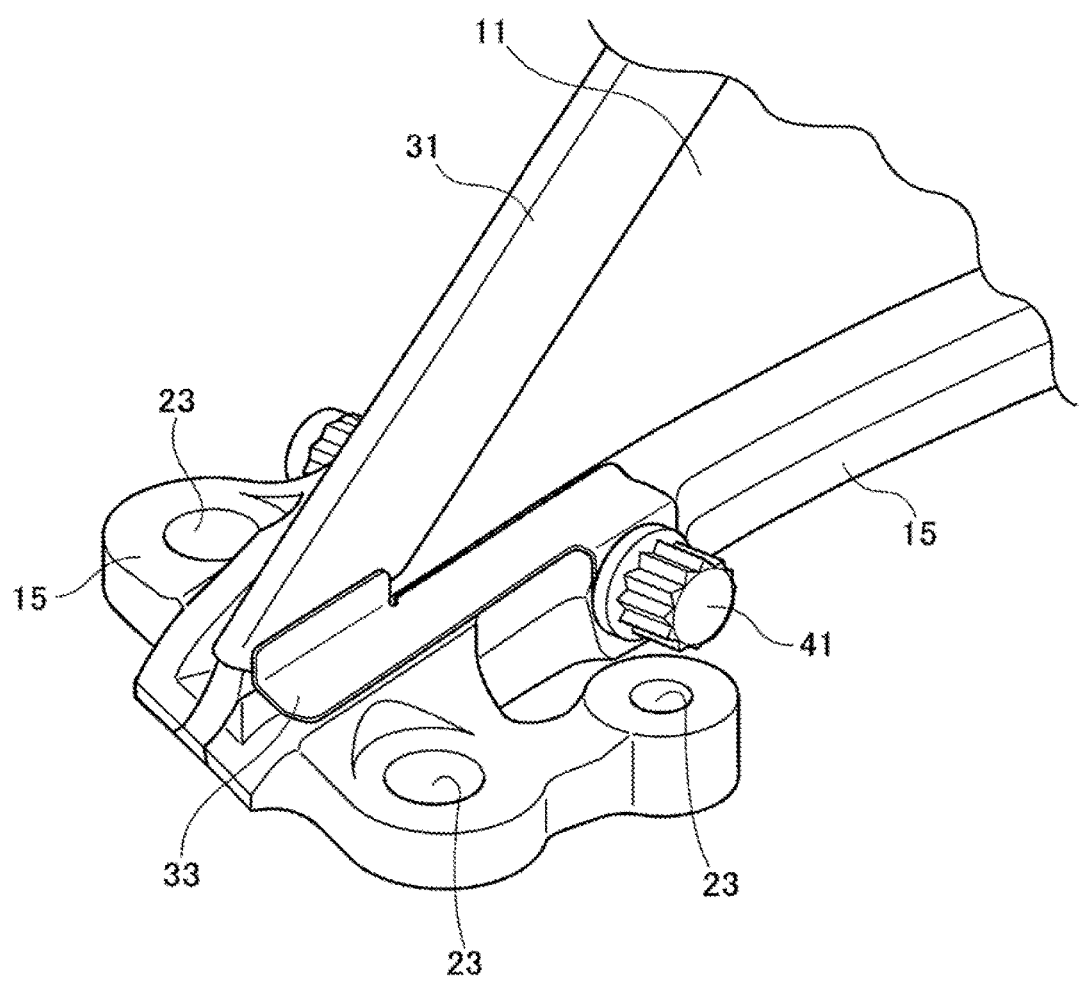
FIG. 4 is a perspective view of the vane and the structure supporting the vane, particularly showing details of an electrically conductive pad.

Referring mainly to FIG. 3, an inner end lie of the vane 11 bulges laterally outward in order to reinforce the supportive ability, which is pinched by the support structure 15. Referring to FIG. 4, a bolt hole is opened so as to penetrate the support structure 15 and the inner end lie, and a bolt 41 is inserted and tightened therein, thereby fixing the inner end 11e and the support structure 15 mutually. The support structure 15 has another set of bolt holes 23 in addition, thereby being fixed to the core portion 7. The outer end has a similar structure and is thereby fixed to the nacelle 5.

Figure 6A:
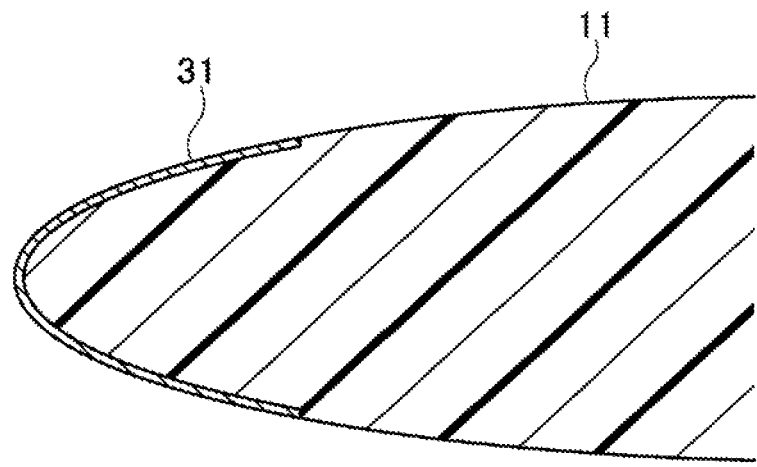
FIG. 6A is a sectional plan view particularly showing a relation between the vane main body and the sheath.

The leading edge of the main body of the vane 11 is covered with a sheath 31 formed of a proper metal. This sheath 31 prevents erosion of the vane 11 by frictional attack by airflow including sand or dust. As the material applied to the sheath 31 exemplified are, while properly selected in view of erosion resistance and machinability, titanium, titanium alloys, nickel, nickel alloys and stainless steels for example. Preferably the sheath 31 is made in close contact with the leading edge of the main body of the vane 11 without any gap therebetween, as shown in FIG. 6A. This structure with close contact leaving no gap can be realized by any generally known plastic forming but superplastic forming may be instead applicable. Some titanium alloys are proper for use of superplastic forming. Further, if possible, any other production method such as casting or machining may be applicable.

Referring back to FIG. 4, an electrically conductive pad 33 is provided as if it bridges from the sheath 31 to the bolt 41. The electrically conductive pad 33 is formed of a proper metal, and preferably the same material as the sheath 31 is applied thereto. As air sucked by the fan 3 contains a considerable amount of humidity, this portion is placed under a humid condition sufficient to cause corrosion. If an identical material is applied to both the sheath 31 and the electrically conductive pad 33, bimetallic corrosion can be prevented.

Figure 5A:
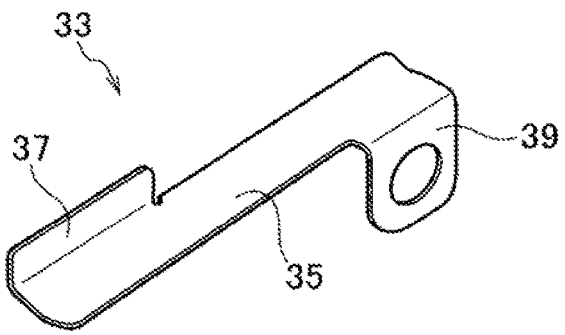
FIG. 5A is a perspective view of the electrically conductive pad.

The electrically conductive pad 33, as shown in FIG. 5A, has a leader portion 35, a contact portion 37 elongated upward from its end, and a washer portion 39 elongated downward from another end thereof. The contact portion 37 is used for connection with the sheath 31 and the washer portion 39 is used for connection with the bolt 41.

Figure 5B:
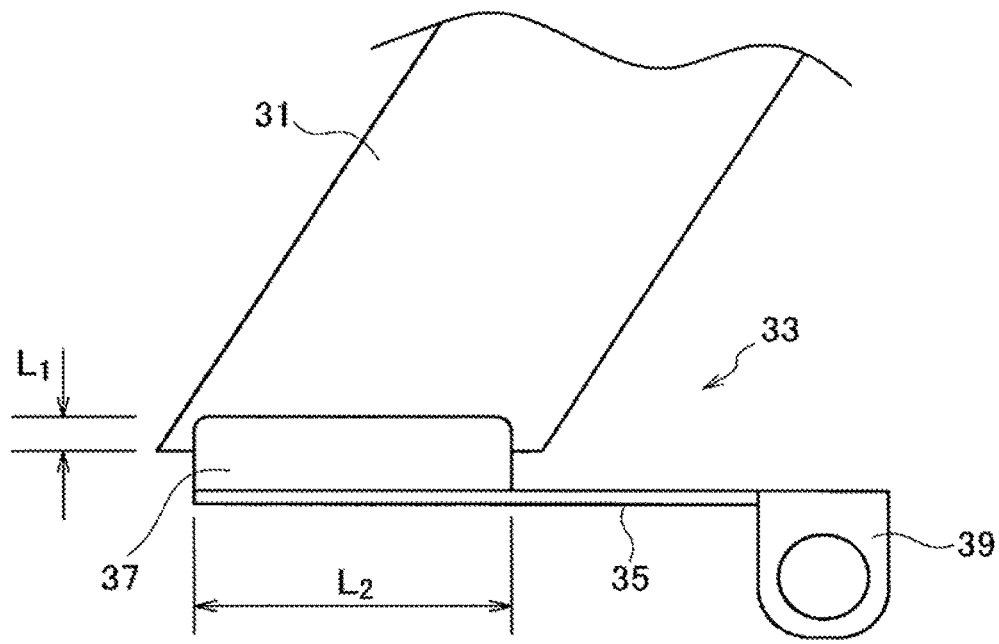
FIG. 5B is an elevational view of a part of the electrically conductive pad and the sheath.

The contact portion 37 is so dimensioned as to have a proper overlap with the end of the sheath 31. Referring to FIG. 5B, the width L1 of the overlap is for example 1 mm or more so as to establish a sufficient contact area, and the length L2 thereof is 10 mm or more. In view of reduction of electric resistance, it is more advantageous as both the width L1 and the length L2 are made larger, however, these upper limits are restricted because of its structural factors. For example, if the upper end of the contact portion 37 projects into the bypass duct, it may cause disruption in airflow. Thus the width L1 is limited so as to have the upper end not to reach the inner liner 19. Further, as the overlap must not exceed the width of the sheath 31, the length L2 is limited by the width of sheath 31.

The end of the sheath 31 and the contact portion 37 may be joined together by spot-welding executed by spot-energization. Alternatively, instead of the spot-welding or in addition thereto, welding, soldering, bonding by an electrically conductive paste, or crimping can be applied thereto. These means are advantageous in the point that they can reduce contact resistance at the joint between the sheath 31 and the contact portion 37 formed thereby and ensure bonding strength therebetween.

The washer portion 39 has a hole into which a bolt is insertable, and a bolt 41 is inserted therein. The bolt 41, as passing through the washer portion 39 and being tightened with the support structure 15, establishes electric connection between the electrically conductive pad 33 and the support structure 15. Alternatively, it could be connected not with the bolt 41 but with any other bolt such as a bolt tightened in any of the bolt holes 23. Further alternatively, instead of tightening by a bolt, or in addition thereto, any joint by soldering or welding is applicable. However, considering that they may be disassembled later for the purpose of inspection, maintenance or repair, connection by tightening is more reasonable.

By the structure as described above, the sheath 31 establishes electric connection with the core portion via the electrically conductive pad 33 and the support structure 15. As sufficiently low resistance could be expected at each contact point, electric resistance throughout the conduction path is expected to be sufficiently low.

The outer end of the vane 11 has a similar conduction structure that establishes electric connection between the sheath 31 and the fan case. The fan case and the core portion are thereby mutually electrically connected with low resistance through the sheath 31 and the electrically conductive pad 33, more specifically through the path bypassing the vane main body of CFRP. This electric conduction structure may be applied to all of the vanes 11.

According to the aforementioned embodiment, the electric resistance between the fan case and the core portion is reduced down to about several tens or several hundred milliohms. This is sufficiently low resistance to reduce a risk of generating spark. Further, as this is reduced by a factor of ten as compared with that in a case where electric current flows through the vane 11, it could be considered that electric current mainly bypasses the vane main body. This is advantageous in prevention of deterioration of the matrix resin in CFRP.

Further the aforementioned embodiment prevents electric current from flowing through the inner liner and the outer liner. Even in a case where they are formed of CFRP, its deterioration is effectively prevented. Further, as the inner liner and the outer liner are not necessary to be used as electric conduction paths, they can be insulated from the vane. In a case where they are formed of an aluminum alloy or such for example, insulation treatments such as anodization could be applied thereto. Even in a case where a distinct metal such as titanium is applied to other members, bimetallic corrosion will not occur. This applies to a case where a platform structure is used instead of the liners.

Figure 6B:
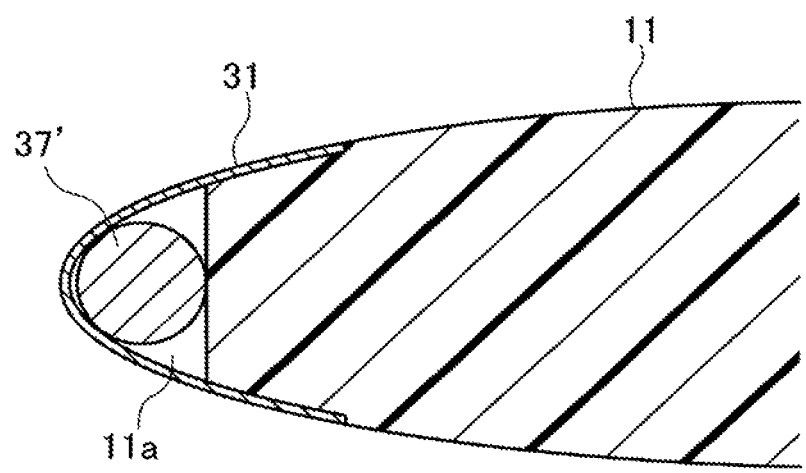
FIG. 6B is a sectional plan view particularly showing a relation between the vane main body and the sheath in accordance with a modified example.

Various modifications will occur in the aforementioned embodiment. For example, as shown in FIG. 6B, an auxiliary electrically conductive wire 37' is applicable thereto. The electrically conductive wire 37' is made to pass through a space 11a between the vane main body and the sheath 31 and is joined with the contact portion 37 by means of welding or such. Alternatively this may be directly connected with the bolt 41 or any other bolts. Further alternatively, the electrically conductive wire 37' may be embedded in the vane main body. Such an electrically conductive wire 37' can, in place of or in addition to the sheath 31, function as an electric conduction path having low resistance.

Although certain embodiments have been described above, modifications and variations of the embodiments described above will occur to those skilled in the art, in light of the above teachings.

INDUSTRIAL APPLICABILITY

An electric conduction structure that establishes an electric conductive path with low resistance between a fan case and a core portion, which is capable of conducting and diverting electric current from a vane main body, is provided.

What is claimed is:

1. An electric conduction structure for conducting and diverting electric current from a vane main body of an outlet guide vane into an exterior support structure, comprising:
   a sheath of a metal covering a leading edge of the vane main body; and
   an electrically conductive pad of the metal comprising a contact portion so dimensioned as to have an overlap with an end of the sheath, and a washer portion into which a bolt for being tightened into the support structure is insertable,
   wherein any joints of a weld, a spot-weld, a solder, a bond by an electrically conductive paste and a crimp establish connection between the end of the sheath and the contact portion, and
   wherein the electrically conductive pad includes a leader portion, the contact portion extending upward from a first lateral side of the leader portion at a first end of the leader portion, and the washer portion extending downward from a second lateral side of the leader portion at a second end of the leader portion.

2. The electric conduction structure of claim 1, wherein the metal is any of titanium, titanium alloys, nickel, nickel alloys, and stainless steels.

3. The electric conduction structure of claim 1, wherein the overlap has a width of 1 mm or more and a length of 10 mm or more.

4. The electric conduction structure of claim 1, further comprising:
   an electrically conductive wire interposed between the sheath and the vane main body and electrically connected with the electrically conductive pad.

* * * * *